Sept. 4, 1934.  A. COHEN ET AL  1,972,702
COMBINED WHEEL LIFTER AND SKID CONTROL
Filed Nov. 25, 1931   5 Sheets-Sheet 4
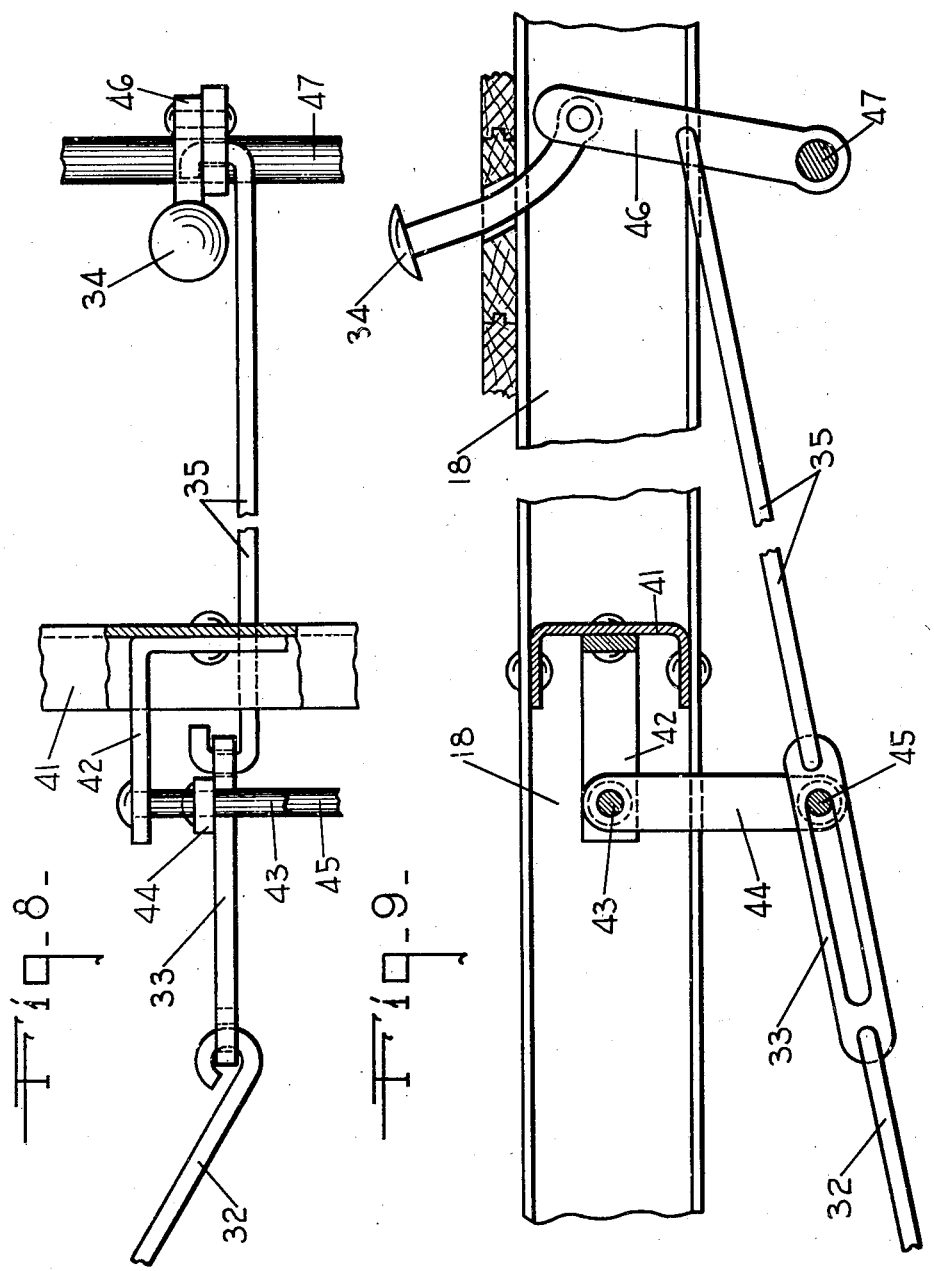
Inventors
ABE COHEN AND
By JOHN GATELY
Hiram A. Sturges Attorney

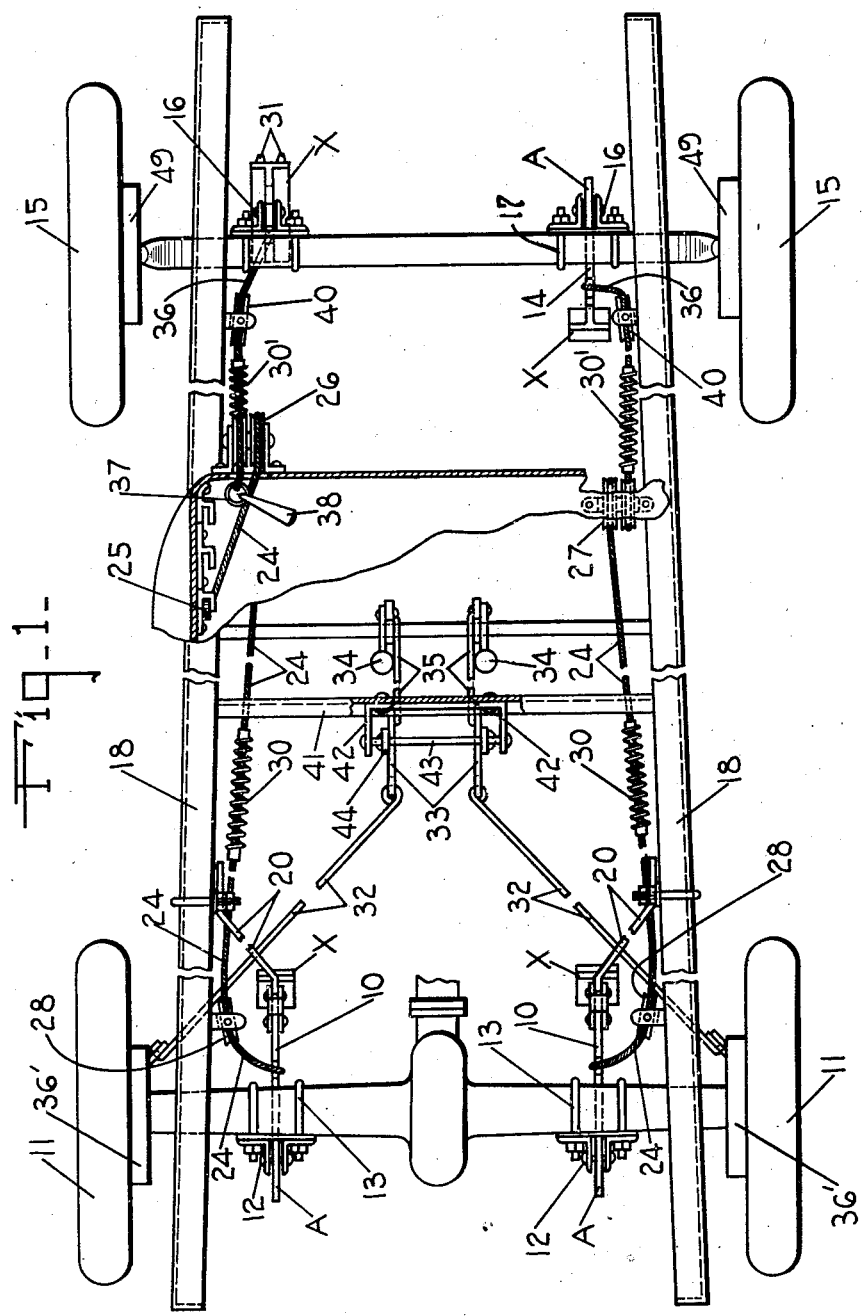

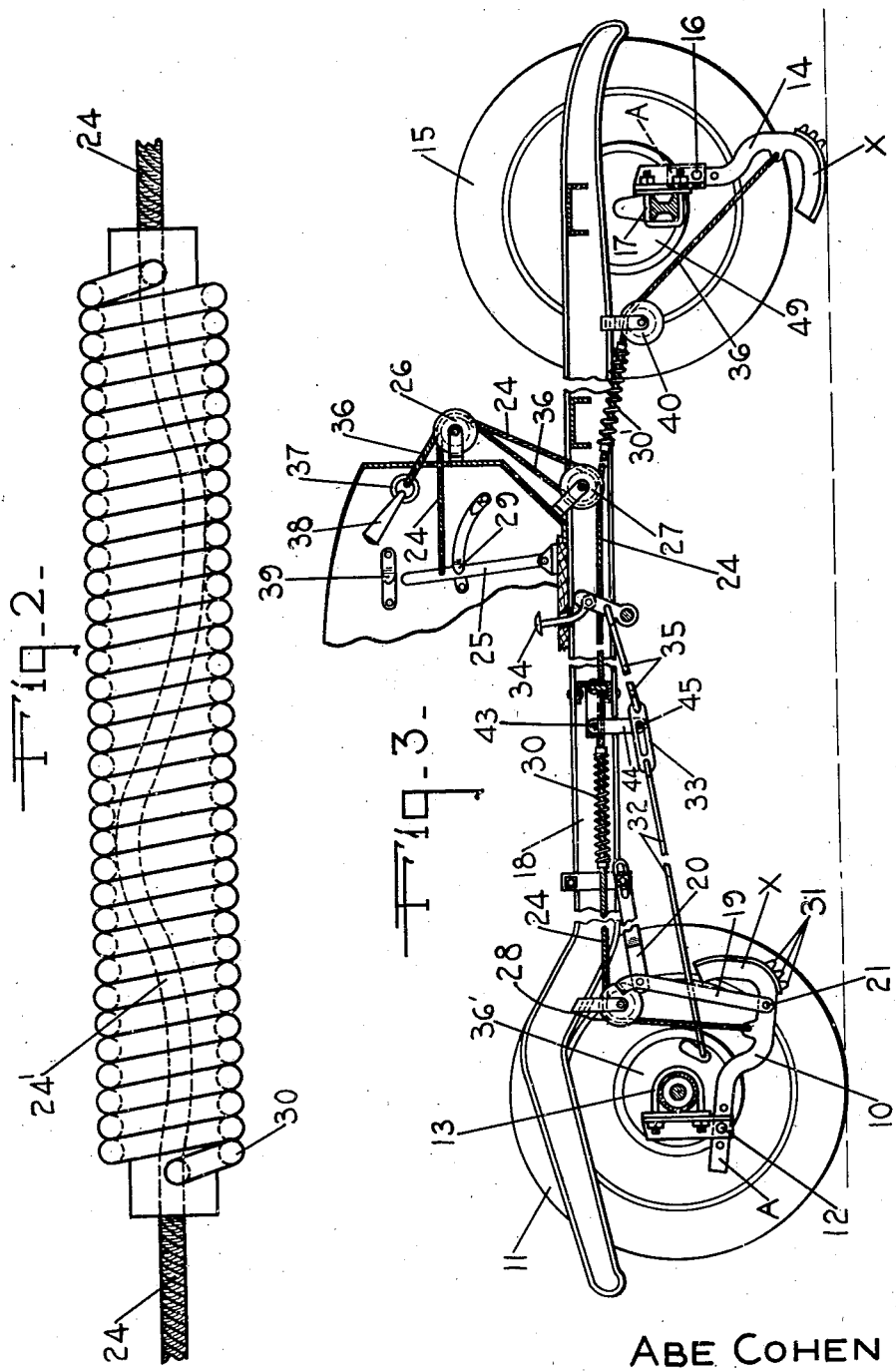

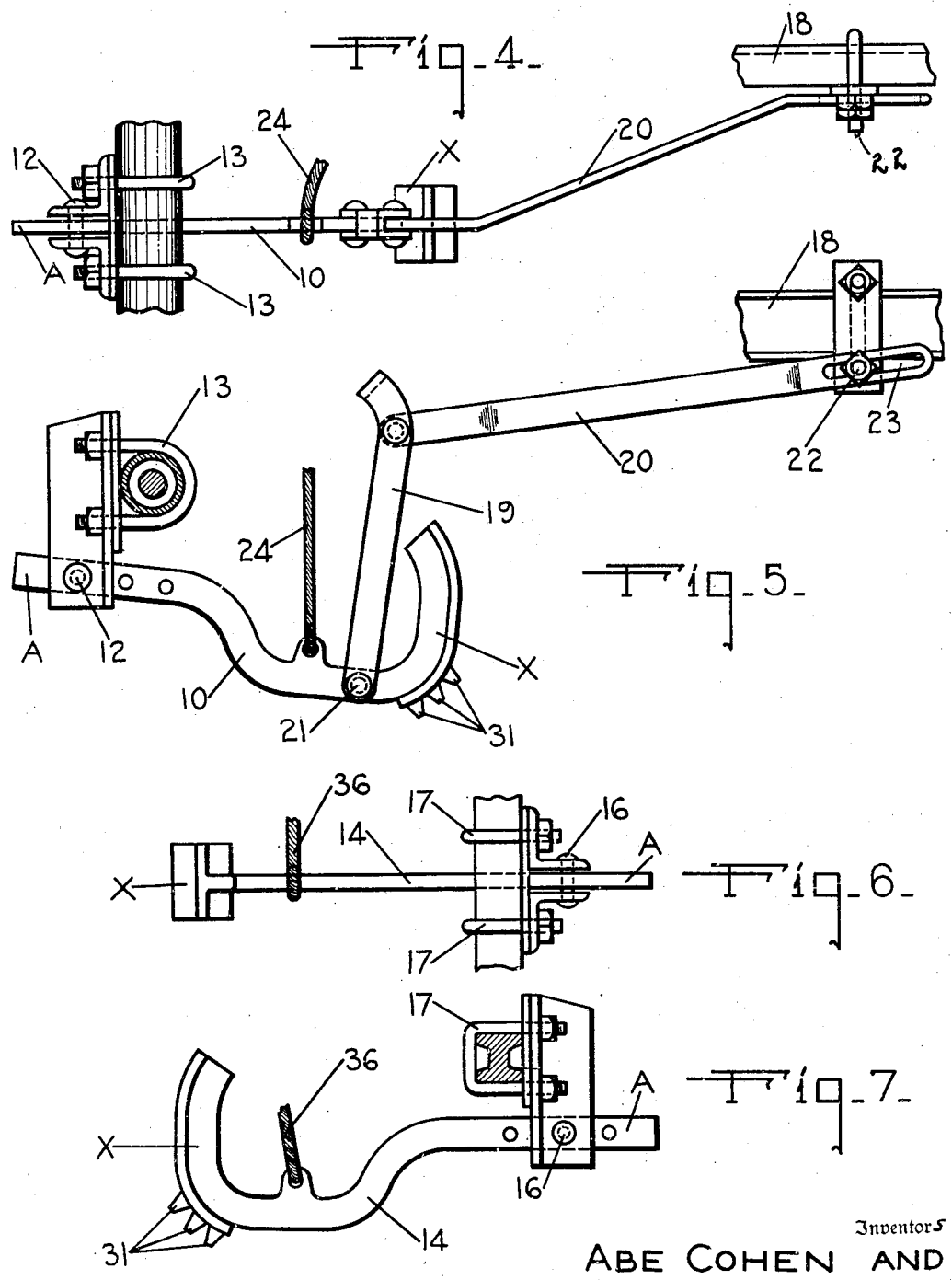

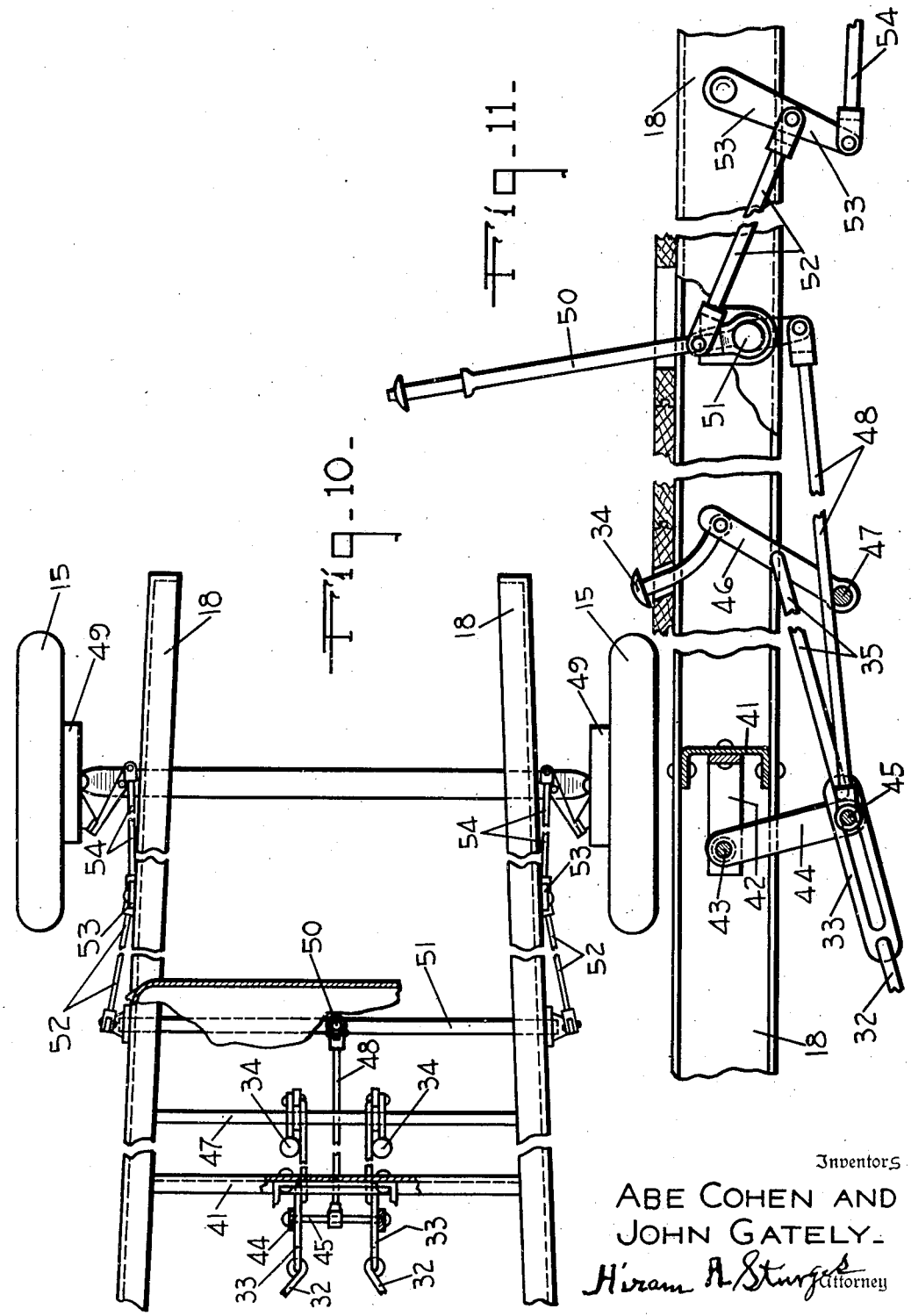

Patented Sept. 4, 1934

1,972,702

UNITED STATES PATENT OFFICE 1,972,702

COMBINED WHEEL LIFTER AND SKID CONTROL

Abe Cohen and John Gately, Gretna, Nebr.

Application November 25, 1931, Serial No. 577,364

10 Claims. (Cl. 188—5)

This invention relates to a combined wheel-lifter and skid control for motor propelled vehicles and more particularly for automobiles and trucks, and has for its object, broadly, to provide means for lifting and supporting any selected wheel in an elevated position whenever removal of a tire is required, and to provide a control to immediately prevent skidding, said means to be operated by the driver of the vehicle without leaving his seat.

It is an object of the invention to utilize the power of the engine for lifting the wheels, the operation of preventing skidding requiring no power, and being automatic under control of the driver.

The invention includes the use of lifting-arms, each being mounted on the vehicle adjacent to a wheel, said arms not adding materially to the weight and not being obtrusive or interfering in the operation of other parts of the vehicle.

It is an object of the invention to provide means which may be operated readily and conveniently by the driver to prevent skidding of the vehicle or for elevating one end of an axle to permit removal of a wheel or a tire, said means to consist of few and simple parts so that manufacture will be economical, and that the device may be applied to vehicles generally, or may be applied at the time of manufacture.

With the foregoing objects in view and others to be mentioned the invention presents a new and useful construction, combination and arrangement of parts as described herein and claimed, and as illustrated in the accompanying drawings, it being understood that changes may be made in form, size, proportion of parts and minor details, said changes being within the scope of the invention as claimed.

In the drawings, Fig. 1 is a broken away plan view showing the chassis of a motor vehicle with the parts applied thereto for lifting the wheels and to prevent skidding.

Fig. 2 is a plan or side view showing a cable provided with a spring.

Fig. 3 is a view in longitudinal section through the chassis, to illustrate the parts shown in Fig. 1.

Fig. 4 is a plan view of a lifting-arm for a rear wheel. Fig. 5 is a side view of the same.

Fig. 6 is a plan view of a lifting-arm for a front wheel and Fig. 7 is a side view thereof.

Fig. 8 is a detail showing the connections for a brake rod, and Fig. 9 is a side view of same.

Fig. 10 is a detail relating to Fig. 1, being a broken away plan view showing the front part of a vehicle and braking mechanism thereon.

Fig. 11 is a broken side view of parts shown in Fig. 10.

Referring now to the drawings for a more particular description, in which like numerals of reference indicate like parts, numerals 10 indicate a pair of lifting-arms each being disposed adjacent to a rear wheel 11, the upper rear end of each arm being pivotally mounted as indicated at 12 between a pair of brackets which, by means of U-bolts 13, are secured to the casing of the differential gear. The brackets and U-bolts and pivot-pin 12 for the mounting of the upper end-portion of each lifting-arm constitute a clamping-member and is thus designated in the claims.

It will be understood that the lifting-arms 10 are of identical construction and that each arm is operated independently of the other arm, and the parts for operating said arms 10 are identical as compared with each other.

Numerals 14 indicate a pair of lifting-arms for the front wheels 15, each arm 14 being pivotally mounted as indicated at 16 upon and disposed between a pair of brackets which are secured to the front axle by means of a pair of U-bolts 17, each lifting-arm 14 being disposed adjacent to a front wheel 15. All of the lifting-arms mentioned are provided with a shoe X.

It will be understood that each lifting-arm may be used independently of the other arms when removal of a wheel is required or when it is desired to remove a tire from a wheel, and that the lifting-arms may be used to prevent skidding.

Since the lifting-arms are never used except in emergency cases they are normally maintained in an elevated position but under control of a driver. The pivotally mounted lifting-arms or any selected lifting-arm may be immediately swung downwardly into engagement with the ground.

Each rear lifting-arm 10 is mounted to permit swinging movements from a side 18 of the vehicle chassis by use of a pair of pivotally connected links 19 and 20, each link 19 being pivotally mounted at 21 on an arm 10 and each link 20 being pivotally mounted on a U-bolt 22 which is mounted on a side 18 of the vehicle chassis, a slot 23 preferably being formed in the end of the link 20 for receiving said bolt.

Numeral 24 indicates a cable and two of these rearwardly extending cables are used, each being secured to a lifting-arm 10 for controlling its movements, the opposite end of each cable being secured to a hand-lever or similar control-element 25 mounted upon the vehicle adjacent to the driver's seat (not shown), each cable 24 moving upon suitable pulleys or sheaves for controlling direction, as for instance, a double sheave 26, a double sheave 27 and a single sheave 28 (Fig. 1), said sheaves having any suitable mounting on the vehicle.

Suitable detents or catch-members 29 are provided for holding the levers 25 after they have been swung rearwardly, and in operation when it is desired to lift one of the rear wheels to permit removal of a tire, the driver releases a lever 25 from a catch-member 29 and, by action of gravity, an arm 10 will immediately swing downwardly into engagement with the ground, the cable 24 moving on the sheaves mentioned.

It will be understood that, as soon as a lifting-arm 10 engages the ground, the rugose surface or projections 31 will prevent any sliding movement of a shoe X on the surface of the ground. At this time the lifting-arm will be inclined downwardly and forwardly and not vertically.

The vehicle is then moved forwardly by use of the motor, the result being that the lifting-arm 10 will be disposed in approximately a vertical position, and the vehicle wheel will be lifted from the ground a sufficient distance to permit removal thereof or removal of the tire.

It will be seen that when the vehicle is moved forwardly as last mentioned, the link 20 may have a limited rearward movement, this rearward movement of said link 20 being a distance equal to the length of the slot 23.

Also it will be seen that the distance of the forward movement of the vehicle last mentioned, for elevating the wheel, is not material, the operation being that as soon as a lifting-arm 10 is disposed in a vertical position the bolt 22 will be disposed in the forward end of the slot 23 which will prevent any further movement of the link 20 in a rearward direction, and the arm 10 will be maintained in approximately a vertical position and the shoe X will slide on the ground during any forward movement of the vehicle.

After a wheel has been replaced or a tire has been mounted on a wheel, the lifting-arm may be swung upwardly to a normal position by use of the lever 25, the vehicle being moved rearwardly to permit disengagement of the shoe X from the ground.

Fig. 2 of the drawings shows a spiral spring 30, the ends of the spring being secured to the cable 24 and providing a loose part 24' within the spring, and in operation, when an arm 10 has been elevated to its normal position and the lever 25 is disposed in the catch 29, the spring 30 will be expanded and the part 24' within the spring will be in a taut condition. In fact, the entire cable will be in a taut condition for maintaining the arm 10 in its uppermost position.

To prevent skidding while driving an automobile, all that is necessary is a release of the levers 25 from the catches 29, and when thus released the lifting-arms 10 will swing into engagement with the ground and will move to a vertical position to prevent any sliding movement on the ground of said rear wheels.

It is appreciated that, after one of the rear wheels has been elevated from the ground, as above mentioned, the function of traction for propelling the vehicle forwardly must be discharged by the opposite rear wheel, and therefore, in order that stresses may be directed uniformly to the differential gear (not shown) and that the unequal stresses, thus directed, which otherwise might cause injury to some of the parts, means are provided for preventing any rotation of the elevated wheel.

These last named means consist of a pair of brake rods 32, each connected at its front end with a slide-coupling or loop 33, each loop 33 being connected with a foot treadle 34 by means of a pull-rod 35, and it will be seen that if a treadle 34 is pressed downwardly the pull-rod and brake rod connected therewith will move forwardly for operating the brake in the housing 36' of a wheel 11.

In operation, for removing a rear wheel or for removing a tire, the vehicle being at rest, a lifting-arm 10, by movement of a hand lever 25, may swing downwardly, by action of gravity, to engage the ground. A foot treadle 35 is then used for actuating the brake in the housing 36' of the wheel. The vehicle is then driven forwardly to cause the lifting-arm to be disposed in a vertical position, the wheel being elevated from the ground, and prevented from rotating, by action of the brake, during the forward movement of the vehicle.

The means for elevating the front wheels 15 from the ground is similar to the means for elevating the rear wheels.

Numerals 36 indicate a pair of forwardly extending cables each being attached to a lifting-arm 14, its opposite end being provided with a ring 37, said ring being provided with a control-element or handle 38.

Each cable 36 may be moved rearwardly, by use of the handle 38 to dispose the ring 37 on a hook 39 which is suitably secured to the vehicle, said rearward movement of the cable causing a lifting-arm 14 to swing rearwardly to approximately a horizontal position, and when the ring is disposed in engagement with the hook the lifting-arm 14 will be maintained in said horizontal position.

Each cable 36 is in engagement with the double-sheaves 26 and 27 and a sheave 40.

Numerals 30' indicate a pair of spiral springs for use in connection with the cables 36, each spring 30' being the same as shown in Fig. 2 of the drawings and used for the same purpose, that is to say, they each tend to maintain a cable 36 in a taut condition when a ring 37 engages a hook 39 for supporting a lifting-arm 14 in its uppermost inoperative position.

In operation, when removing a front wheel or when removing a tire therefrom, a ring may be removed from a hook and the lifting-arm 14, by action of gravity, will swing downwardly into engagement with the ground and will be disposed in an inclined position. The vehicle may then be moved rearwardly to cause the lifting-arm to be disposed in a vertical position, the wheel by this operation being lifted from the ground.

It will be noted that the pivotal mountings 12 and 16 for the respective lifting-arms 10 and 14 are located adjacent to their inner ends, and that an end-portion A of each arm projects beyond its pivotal mounting, and when the lifting-arms are disposed in operative position the end-portions A operate as braces and prevent swinging movements in excess of 90 degrees of said arms while said arms are moving to operative positions.

The lifting-arms 14 are not generally used to prevent skidding, but may be used to advantage to prevent rearward sliding movements of a vehicle upon inclined surfaces in instances where such inclined surfaces are covered with ice or mud. In such instances traction provided by the rear wheels is often inadequate for a movement upwardly on steep grades, and a rearward sliding movement, by use of said arms 14 may be prevented.

The brake rods 32 which may be moved independently of each other by the foot treadles 34, as explained, may be used collectively in connection with the "four wheel brakes" now in general use on automobiles.

Numeral 41 (Figs. 1, 8, 9) indicates a cross-beam which connects the sides 18 of the chassis of an automobile, this cross-beam being generally used in the construction of automobiles, said beam being provided with a pair of bracket-arms arms 42.

In the present instance we provide a horizontal pivot-pin 43 and mount it in the bracket-arm 42 and mount thereon a pair of rock-arms 44, and on the lower ends of these rock-arms is mounted a second horizontal pivot-pin or rock-bar 45 which engages in the slots of the slide-couplings 33.

The foot pedals 34 are pivotally mounted on links 46 which are pivotally mounted on a stationary cross-rod 47, and it will be seen that when the pull-rods 35 are moved forwardly by use of the foot-pedals 34 the pivot-pin or rock-bar 45 will not be moved, and therefore the brake rods 32 may be operated independently of each other for the purpose of preventing a rotatable movement of a rear wheel to permit it to be lifted from the ground, but it will be seen that if the lower horizontal pivot-pin or rock-bar 45 is moved forwardly, the brakes for the front wheels as well as brakes for the rear wheels could be coincidently actuated.

While the present invention does not include an improvement in vehicle brakes, a description of these brakes appears to be necessary for the reason that operation of the lifting-arms for the rear axle is not practical except when the brakes for the rear wheels are used. In other words, when elevating one end of a rear axle by use of the device it is necessary to drive the vehicle forwardly a short distance, but since the operation of a differential gear for propelling the vehicle requires that both of the rear wheels shall remain on the ground to provide traction, it is necessary to apply the brake to the wheel to be elevated; and if the brake is thus applied, the remaining rear wheel will provide the necessary traction for said forward movement of the vehicle.

In the present instance we have provided a very simple and inexpensive means for temporary use in braking either one of the rear wheels, consisting of the single link or slide-coupling 33 for each brake-rod heretofore mentioned. By use of the parts herein described the use of the pair of these links 33 will not interfere with the operation of any of the front or rear wheel-brakes, and will provide the necessary separate braking for the rear wheels.

Numeral 48 indicates a link which is pivotally mounted at its rear end upon the rock-bar 45, the front end being pivotally mounted on a hand lever or equivalent member 50, the latter being mounted upon a horizontal cross-rod 51 which is mounted in the sides 18 of the chassis, and it will be seen that if the element 50 has a rearward swinging movement the link 48 together with the rock-bar 45 and brake-rods 32 will be moved forwardly.

Numerals 52 indicate a pair of links which extend forwardly of the vehicle, each being pivotally mounted at its rear end upon the lever 50, their front ends being pivotally mounted upon and midway between the ends of links 53 which are pivotally mounted on the sides 18 of the chassis.

Numerals 54 indicate the pair of brake-rods for the front wheels, each being attached, in the usual manner, to a wheel-brake in a brake-housing 49 and having a pivotal mounting at one of its ends on a link, and as thus described it will be seen that the movement mentioned for the hand lever 50 will cause braking for all of the wheels of a vehicle.

In the operation of our invention, however, we do not require the use of brakes for the front wheels, but do require the use of separate braking means for the rear wheels, and since our means for braking does not interfere with the operation of the "four-wheel brakes" and may be provided at a very limited cost, it is obviously of advantage.

We claim as our invention,—

1. In a combined wheel-lifter and skid control for a movable vehicle having a driver's seat, a plurality of arms each provided with a shoe and pivotally mounted adjacent to a wheel, control-elements mounted on the vehicle adjacent to the driver's seat, each control-element having a connection with an arm and being movable to permit said arm to move downwardly with its shoe engaging the ground and to be moved to approximately a vertical position by a movement of the vehicle to cause said wheel to be lifted from the ground.

2. In a combined wheel-lifter and skid control for a movable vehicle having a driver's seat, a plurality of rigid arms each pivotally mounted adjacent to a wheel, control-elements mounted on the vehicle adjacent to the driver's seat, flexible members connecting the control elements with said arms, each control element being movable to permit an arm to move into engagement with the ground and to permit said arm to be disposed in approximately a vertical position by a movement of the vehicle for lifting a wheel from the ground.

3. In a combined wheel-lifter and skid control for a movable vehicle having a seat, a plurality of arms each provided with a shoe and pivotally mounted on a vehicle adjacent to a wheel, control-elements mounted on the vehicle adjacent to said seat, flexible members each connecting a control-element with an arm and adapted to be moved to permit an arm to move downwardly with its shoe in engagement with the ground and to be moved by the vehicle to approximately a vertical position for elevating a wheel.

4. In a combined wheel-lifter and skid control for a vehicle, a pair of clamping-members each mounted on the vehicle adjacent to a vehicle wheel, a pair of lifting-arms pivotally mounted between their ends on the clamping-members and arranged to have downward swinging movements to operative positions with an end-portion of each arm engaging the ground and its opposite end engaging a clamping-member, each lifting-arm having means connected with the vehicle whereby one of said arms may be maintained in inoperative position while the other arm of said pair moves to said operative position.

5. In a combined wheel-lifter and skid control for a vehicle, a pair of clamping-members each mounted on an axle adjacent to a vehicle wheel, a pair of rigid lifting-arms each provided with projections and pivotally mounted between its ends on a clamping-member and adapted to have a downward swinging movement with its projections engaging the ground and an end-portion thereof engaging a clamping-member, each lifting-arm having control-devices connected with the vehicle for maintaining said arm in a stationary position relative to said vehicle while the other lifting-arm of said pair has said downward swinging movement.

6. In a combined wheel-lifter and skid control for a vehicle, a pair of clamping-members mounted on the vehicle, a pair of U-bolts mounted on the chassis of the vehicle, a pair of rigid lifting-arms each pivotally mounted between its ends on a clamping-member, a pair of links each pivotally mounted on a lifting-arm, a second pair of links each having a slot at one of its ends receiving a U-bolt and pivotally mounted at its opposite end upon a first named link, and a pair of cables each connected with a lifting-arm and arranged to be moved to permit one end of a lifting-arm to swing downwardly to the ground, the opposite end of said lifting-arm moving into engagement with a clamping-member.

7. In a combined wheel-lifter and skid control for a vehicle having an axle provided with brakes for its wheels, a pair of lifting-arms pivotally mounted on the vehicle, means movable on the vehicle and connected with the lifting-arms to permit a selected lifting-arm to swing downwardly to the ground in inclined position and to be moved to vertical position by movement of the vehicle for lifting a wheel, a pair of brake-rods for said wheel brakes each brake-rod being provided with a loop, a rock-bar pivotally mounted on the vehicle and loosely engaging in said loops, and means connected with a loop arranged to be moved for moving a selected brake-rod to prevent rotation of the vehicle wheel to be lifted.

8. In a combined wheel-lifter and skid control for a vehicle provided with wheel brakes for its front wheels and wheel-brakes for its rear wheels, a rock-bar mounted to permit forward and rearward swinging movements on the vehicle, brake-rods connecting the wheel brakes with said rock-bar, means for actuating said rock-bar, a pair of rigid lifting-arms mounted to permit swinging movements thereof from the rear axle, means movable on the vehicle to permit a selected lifting-arm to swing downwardly to inclined position to the ground for a movement to vertical position by movement of the vehicle to cause elevation of a selected wheel, each brake-rod for a rear wheel-brake being provided with a loop having a loose mounting on said rock-bar, and means on the vehicle for moving a selected loop and wheel brake to prevent rotation of the selected wheel to be elevated.

9. In a combined wheel-lifter and skid control for a vehicle having wheel-brakes for its front wheels and wheel-brakes for its rear wheels, a rock-bar pivotally mounted on the vehicle, brake-rods connecting the rock-bar with the front wheel-brakes, brake-rods connected with the rear wheel-brakes, each last named brake-rod having a loop loosely mounted on said rock-bar, rigid lifting-arms pivotally mounted on the rear axle of the vehicle, means on the vehicle adapted to be moved to permit a selected lifting-arm to swing downward to inclined position and to be moved to vertical position by a movement of the vehicle for elevating said selected wheel, and means on the vehicle for moving a selected loop of a brake rod to prevent rotation of said selected wheel during said movement of the vehicle.

10. In a combined wheel-lifter and skid control for a vehicle having wheel-brakes for its front wheels and wheel-brakes for its rear wheels, a horizontal rock-bar disposed transversely of and pivotally mounted on the vehicle, brake-rods for the front wheel-brakes, brake-rods for the rear wheel-brakes, said last named rods having links mounted slidingly on the rock-bar, a lever on the vehicle connected with and arranged to be moved for coincidentally moving the front wheel-brakes and said rock-bar, a pair of lifting arms pivotally mounted on the rear axle, means movable on the vehicle and connected with a lifting-arm to permit it to swing downward for engaging the ground inclinedly and to be moved to a vertical position by a movement of the vehicle for elevating a selected vehicle wheel, and a pair of foot treadles mounted on the vehicle each connected with a loop of a brake-rod, one of said treadles being movable for preventing rotation of said selected vehicle wheel while in its elevated position.

ABE COHEN.
JOHN GATELY.